(12) United States Patent
Takahashi et al.

(10) Patent No.: US 7,230,888 B2
(45) Date of Patent: Jun. 12, 2007

(54) LIGHT EMITTING DEVICE AND INFORMATION PROCESSING APPARATUS

(75) Inventors: Yuuichi Takahashi, Nara (JP); Kazuo Momoo, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 49 days.

(21) Appl. No.: 11/112,243

(22) Filed: Apr. 22, 2005

(65) Prior Publication Data

US 2005/0243432 A1    Nov. 3, 2005

(30) Foreign Application Priority Data

Apr. 22, 2004   (JP)   .............................. 2004-126602

(51) Int. Cl.
*G11B 7/125* (2006.01)
(52) U.S. Cl. ................. 369/44.12; 369/44.23; 369/44.37; 369/122
(58) Field of Classification Search ............ 369/44.37, 369/44.41, 44.23, 120, 121, 112.01, 112.05, 369/112.23, 94, 44.12, 122; 372/50.1, 50.21, 372/50.23
See application file for complete search history.

(56) References Cited

U.S. PATENT DOCUMENTS

| | | | | |
|---|---|---|---|---|
| 5,986,998 | A  * | 11/1999 | Park | 369/121 |
| 6,347,103 | B1 * | 2/2002 | Song et al. | 372/36 |
| 6,480,456 | B1 * | 11/2002 | Kawamura et al. | 369/120 |
| 6,618,420 | B1 * | 9/2003 | Gen-Ei et al. | 372/50.1 |
| 6,728,193 | B1 * | 4/2004 | Uchizaki et al. | 369/112.01 |
| 7,079,474 | B2 * | 7/2006 | Takahashi | 369/120 |
| 7,116,627 | B2 * | 10/2006 | Yoo et al. | 369/112.01 |

* cited by examiner

*Primary Examiner*—Andrea Wellington
*Assistant Examiner*—Kim-Kwok Chu
(74) *Attorney, Agent, or Firm*—Renner, Otto, Boisselle & Sklar, LLP (57) ABSTRACT

A light emitting device according to the present invention includes: a first light source for emitting light having a first wavelength; and a second light source for emitting light having a second wavelength which is different from the first wavelength, wherein the first light source and the second light source are arranged in the same housing, and a relationship of $\theta h1 > \theta h2$ is satisfied, where $\theta h1$ denotes an angle (full-width-half-maximum) of radiation of the light emitted from the first light source in the horizontal direction, and $\theta h2$ denotes an angle (full-width-half-maximum) of radiation of the light emitted from the second light source in the horizontal direction.

20 Claims, 5 Drawing Sheets

LIGHT EMITTING DEVICE AND INFORMATION PROCESSING APPARATUS

BACKGROUND OF THE INVENTION

1. Field of the Invention

The present invention relates to a light emitting device and an information processing apparatus for optical recording/reproduction of information.

2. Description of the Related Art

When a single apparatus is used to record/reproduce information for a plurality of recording mediums which have different recording density of information, in general, an information processing apparatus having a plurality of light sources is used. For example, for recording mediums such as a Digital Versatile Disc (hereinafter referred to as "DVD") and a compact disk (hereinafter referred to as "CD") which have different formats, a technique for recording/reproduction of information using a single apparatus having two light sources with different wavelengths has been developed and is practically used.

A light emitting device is used in many practical apparatuses having a plurality of light sources. Conventionally, such a light emitting device has a housing which accommodates a single light source. Accordingly, a plurality of light emitting devices are required for a plurality of light sources.

Recently, Japanese Laid-open publication No. 2002-190133 proposes an apparatus including a light emitting device having a single housing which accommodates two light sources for emitting light having different wavelengths (hereinafter referred to as "two wavelength light source device"). According to the light emitting device, the structure of the apparatus can be simplified, the cost of the apparatus can be reduced due to the reduction of the adjustment steps of parts and assemblies, or high reliability of the apparatus can be achieved.

Figure 5:
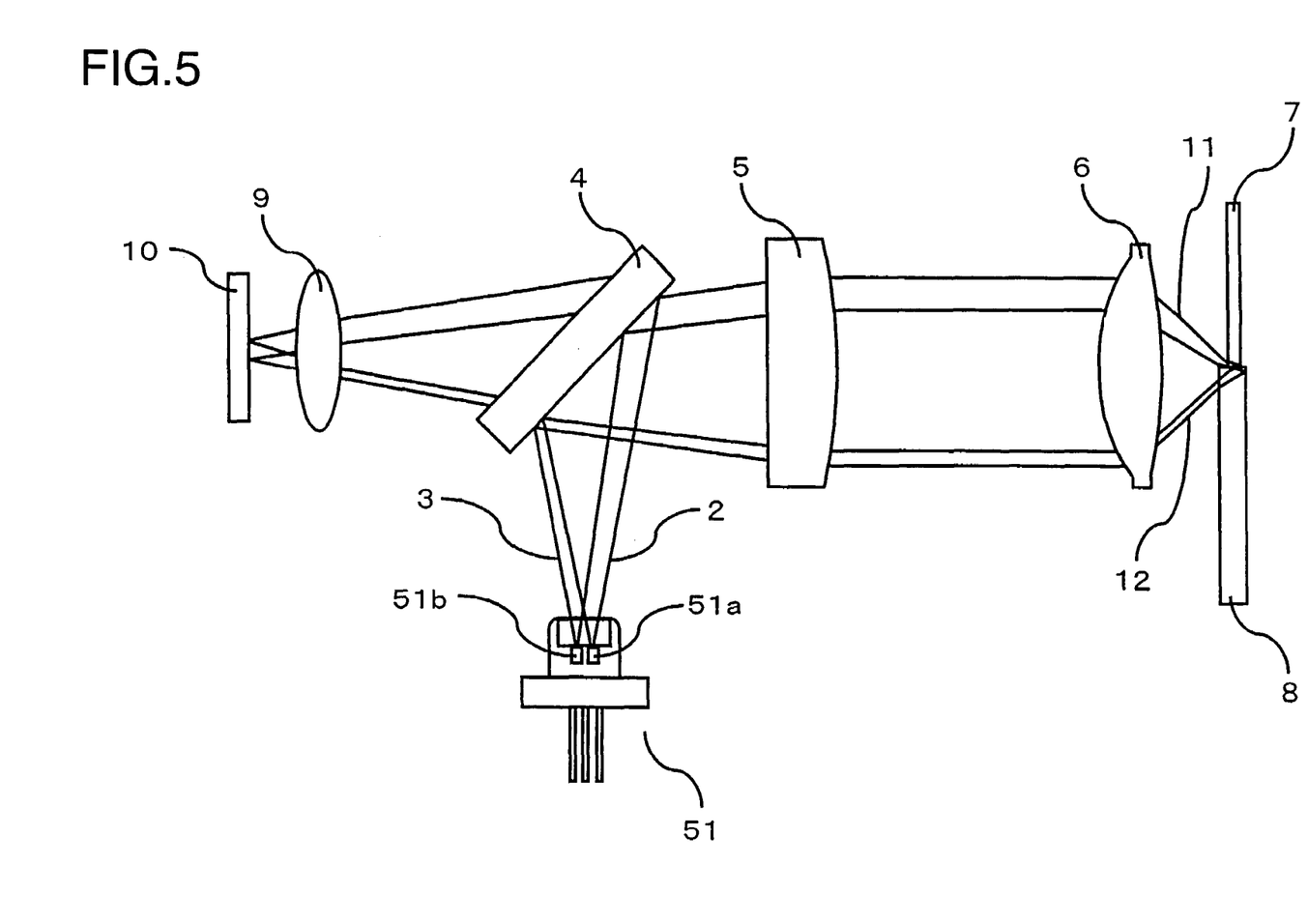
FIG. 5 is a view of the relevant parts of the conventional information processing apparatus

FIG. 5 shows an exemplary structure of an apparatus including a two wavelength light source device. In FIG. 5, 51a denotes a first light source for emitting light having a wavelength λ1 and 51b denotes a second light source for emitting light having a wavelength λ2. The light sources 51a and 52b are arranged within a two wavelength light source device 51.

The light 2 emitted from the light source 51a is reflected by a beam splitter 4, and is converted into substantially collimated light by a collimating lens 5. The substantially collimated light is converged to a first recording medium 7 by an objective lens 6.

The reflected light from the first recording medium 7 reaches the beam splitter 4 through the opposite path. A portion of the light is transmitted through the beam splitter 4 and enters into a light detector 10 via a detection lens 9. Various signals such as a focus signal, a tracking signal and an RF signal can be detected based on the light entering into the light detector 10.

Herein, the structure of the light detector 10 and/or a detection system for various signals are not essential to the invention, since they are already known in public. Therefore, the detailed description thereof will be omitted.

The light 3 emitted from the second light source 51b also reaches the objective lens 6 through the same path as the light 2 emitted from the first light source 51a and converged to a second recording medium 8. Because the first recording medium 7 and the second recording medium 8 have different thickness of the substrates, the objective lens 6 has a structure in which any spherical aberration is corrected for each thickness of the substrates.

Herein, the structure of the objective lens 6 and/or the method for correcting the spherical aberration are not essential to the invention, since they are already known in public. Therefore, the detailed description thereof will be omitted.

The reflected light from the second recording medium 8 reaches the beam splitter 4 through the opposite path. A portion of the light is transmitted through the beam splitter 4 and enters into a light detector 10 via a detection lens 9. Various signals such as a focus signal, a tracking signal and an RF signal can be detected based on the light entering into the light detector 10.

Again, the structure of the light detector 10 and/or a detection system for various signals are not essential to the invention, since they are already known in public. Therefore, the detailed description thereof will be omitted.

Recently, needs for recording information on the recording medium such as CD and DVD at high speed have been increased. In order to accommodate those needs, it is necessary to output light to the objective lens, wherein the light has a high power sufficient to perform high speed recording.

The angle (full-width-half-maximum) of radiation of light emitted from a semiconductor laser having a high power output, which is currently used as a light source for CD recording or a light source for DVD recording, is between 7 to 10 degrees in the horizontal direction and between 16 to 23 degrees in the vertical direction. Thus, the light source for CD recording and the light source for DVD recording have substantially the same radiation characteristics.

It is assumed that an angle of radiation of light emitted from a light source and a Numerical Aperture (hereinafter referred to as "NA") of an objective lens are the same. In this case, as an optical magnification fc/fo is smaller, the efficiency of light becomes higher. Herein, fc denotes a focusing distance of the collimating lens and fo denotes an focusing distance of the objective lens. This enables to efficiently introduce the light from the semiconductor laser into the objective lens.

For this reason, a smaller fc/fo is more advantageous to realize an apparatus corresponding to high-speed recording, which requires that the objective lens outputs light having a high power.

However, making the fc/fo much smaller reduces the rim strength causing some adverse effects such as making the diameter of the focusing spot become larger, dropping signal quality of the reflected light from the recording medium and not obtaining sufficient apparatus performance.

For this reason, fc/fo=4-5 is adopted as a range of the optimal optical magnification when a common semiconductor laser for CD recording is used.

In DVD recording/reproducing, the recording density of information per unit area is higher than for a CD. Therefore, the focusing spot is needed to be narrower than for a CD. For that reason, the wavelength of the semiconductor light source is made shorter than the light source for CD (CD: substantially 0.78 μm, DVD: substantially 0.60-0.67 μm) and the NA of the objective lens is made larger (CD: substantially 0.45-0.53, DVD: substantially 0.60-0.67). Also the rim strength needs to be higher than the optical system for CD recording. Therefore, fc/fo for DVD is higher than that for CD and fc/fo=6-7 is optimum when currently a common semiconductor laser for DVD recording is used.

However, because an optical system from a light source 10a to the objective lens 6 and an optical system from a light source 10b to the objective lens 6 are identical, an optical magnification fc/fo is substantially identical (to be precise, because of differences of refractive index for each wavelength, and the focusing distance of the lens for each wavelength are slightly different), thus, each cannot obtain the optimum fc/fo. Accordingly, when the optimum fc/fo is different, such as the optical system for DVD recording and the optical system for CD recording, there is a problem that a CD high-speed recording performance and recording/reproducing performance resulting from a focusing performance of a focusing spot for DVD are not compatible.

Specifically, when a plurality of light sources use a light emitting device arranged within a same housing and optical systems having different optimum optical magnifications (fc/fo), such as the ones used for an optical system for DVD recording and an optical system for CD recording, are composed of identical optical systems, the conventional technique can not obtain an optimum fc/fo for each optical system. Therefore, when an optical magnification is made to a value close to the optimum fc/fo for an optical system for DVD recording, the efficiency from a light source of a CD becomes lower and a high-speed recording performance can not be obtained. On the other hand, when an optical magnification is made to a value close to the optimum fc/fo for an optical system for CD recording, the rim strength of light incident on an objective lens from a light source for DVD drops, a focusing performance of the focusing spot of DVD drops and therefore, the desired DVD record-reproducing performance is not able to be obtained.

The present invention solves the conventional problems. Using a plurality of light sources of different wavelengths, it is intended to improve a recording-reproducing performance for a recording medium with a plurality of kinds of different specifications.

SUMMARY OF THE INVENTION

A light emitting device according to the present invention includes: a first light source for emitting light having a first wavelength; and a second light source for emitting light having a second wavelength which is different from the first wavelength, wherein the first light source and the second light source are arranged in the same housing, and a relationship of $\theta h1 > \theta h2$ is satisfied, where $\theta h1$ denotes an angle (full-width-half-maximum) of radiation of the light emitted from the first light source in the horizontal direction, and $\theta h2$ denotes an angle (full-width-half-maximum) of radiation of the light emitted from the second light source in the horizontal direction.

Thus, the invention described herein makes possible the advantages of providing a light emitting device that meets a recording/reproducing performance of a recording medium with a plurality of kinds of different specifications, using a light emitting device with a plurality of light sources arranged within the same housing, with a feature of making an angle of radiation along the horizontal direction of light from a light source, used for an optical system having a relatively small optimum optical magnification, narrower than an angle of radiation along the horizontal direction of light from a light source used for an optical system having a relatively large optimum optical magnification.

These and other advantages of the present invention will become apparent to those skilled in the art upon reading and understanding the following detailed description with reference to the accompanying figures.

DESCRIPTION OF THE PREFERRED EMBODIMENTS

In an optical system using a light emitting device arranged within the same housing, the object of making the performance of an information processing apparatus having different optimum optical magnifications, which are compatible, is realized with the same optical feature as in the conventional apparatus.

Figure 1:
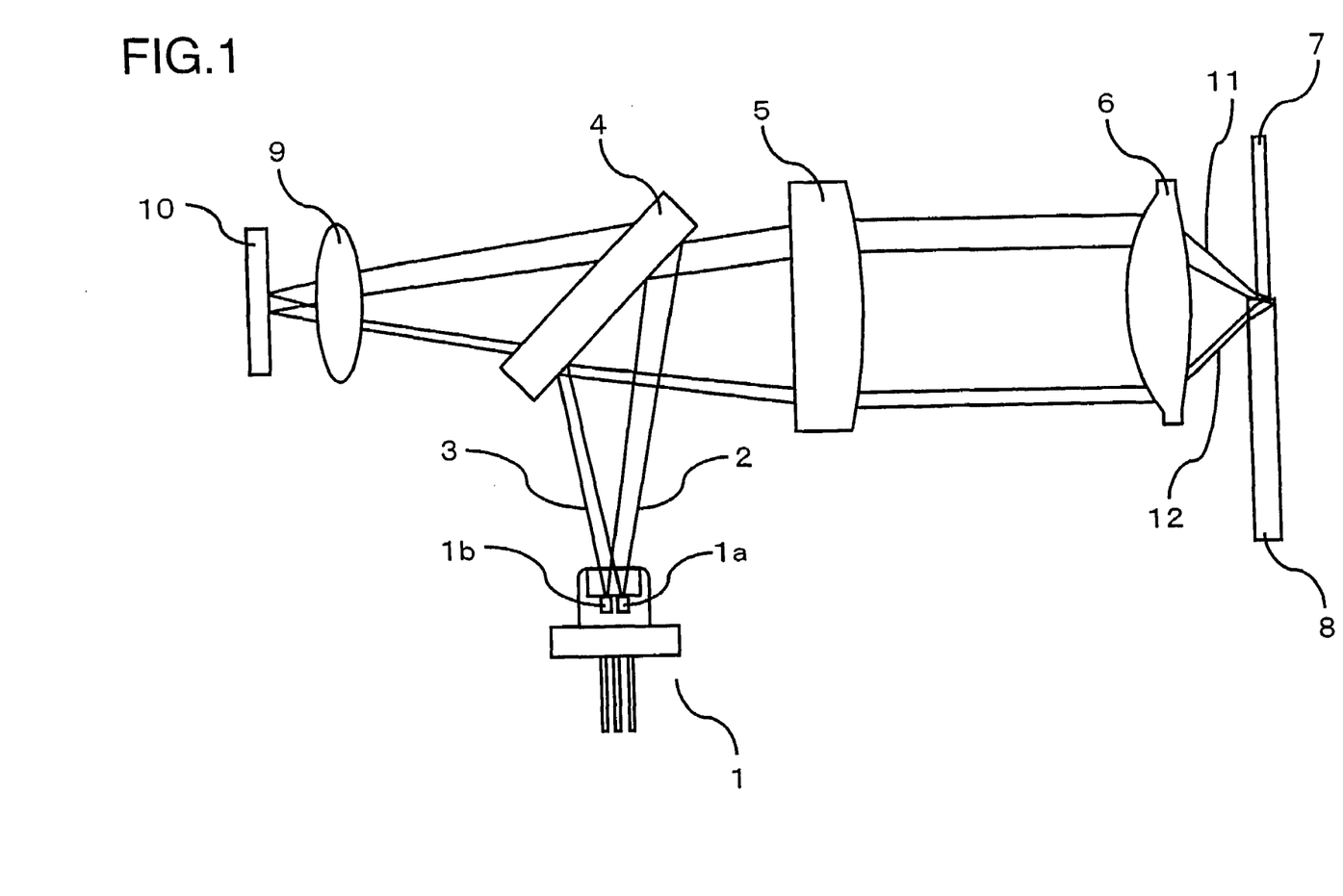
FIG. 1 is a view of the relevant parts of an information processing apparatus according to an embodiment of the present invention.

Herein below, one embodiment of the present invention is explained with reference to the figures. Like reference numbers refer to like or equivalent parts throughout the figures. FIG. 1 is a view of the relevant parts of an information processing apparatus according to a first embodiment of the present invention. Light sources 1a and 1b are arranged to provide two wavelengths within light source device 1. In operation the light emitted from the light sources 1a and 2b is reflected by the recording media 7 and 8 and enters a light detector 10 in the same manner as in the conventional example, therefore, the detailed description thereof is omitted.

Figure 2:
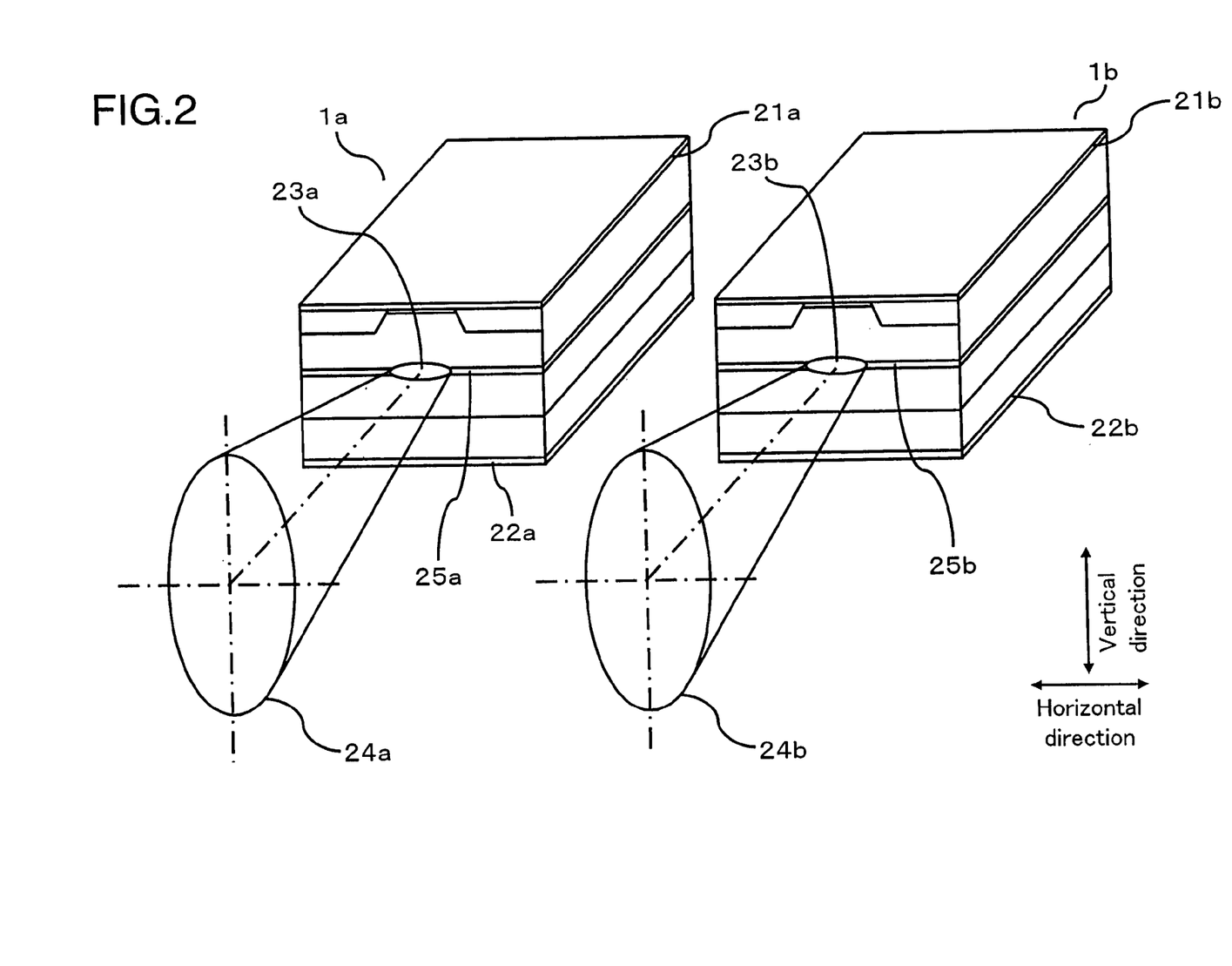
FIG. 2 is an enlarged view of the light sources for explaining the composition of the same light source.

FIG. 2 is an enlarged view of the relevant parts of light sources 1a and 1b to provide two wavelengths within light source device 1. Light sources 1a and 1b are semiconductor lasers and when an electric current is applied from a p-type electrode 21a to an n-type electrode 22a for light source 1a, a carrier (electron/hole) is recombined within an active layer 25a and light of a wavelength corresponding to a band gap energy inherent to the material property of the active layer 25a is generated. With this, the light repeatedly reflects between light guide layers thereby confining the light in the active layer 25a, and laser light from a light emitting point 23a, is emitted. In a similar fashion, when an electric current is applied from a p-type electrode 21b to an n-type electrode 22b for light source 2b, laser light from a light emitting point 23b, is emitted. The detailed description of this is omitted because the principle of operation of a semiconductor laser is not an essential component and is already well-known in public.

Figure 3:
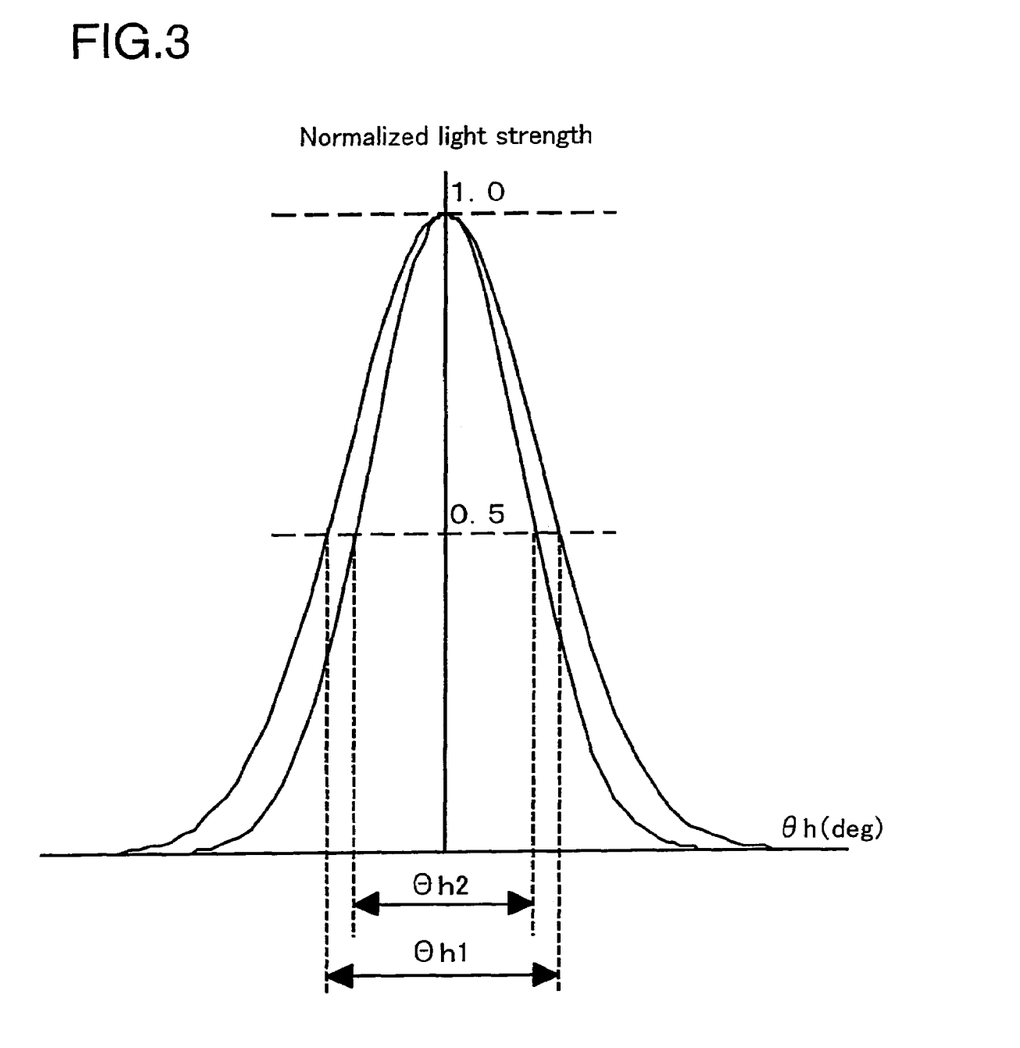
FIG. 3 is a far field pattern along the horizontal direction of light emitted from the same light source.

An example of a far field pattern along the horizontal direction of emitted light 24a emitted from the light emitting point 23a, and a far field pattern along the horizontal direction of emitted light 24b emitted from the light emitting point 23b, are shown in FIG. 3. In FIG. 3, the horizontal axis is the angle and the vertical axis is normalized light strength. Because the angle of emission of light emitted from a semiconductor laser is typically defined by full-width-half-maximum, the angle of radiation of emitted light described below is the full-width-half-maximum. The relationship between angle $\theta h1$ (full-width-half-maximum) of radiation along the horizontal direction of the emitted light 24a emitted from the light emitting point 23a, and angle $\theta h2$ (full-width-half-maximum) of radiation along the horizontal direction of the emitted light 24b emitted from the light emitting point 23b, is θh1>θh2 as shown in FIG. 3. In FIG. 3, in order that the relationship of θh1>θh2 can be seen easily, the strength distribution centers of the far field pattern of the emitted light 24a and the emitted light 24b is shown matched. In practice, when the far field patterns of the emitted light 24a and the emitted light 24b are observed from the identical view point, because of a gap between the light emitting point 23a, and the light emitting point 23b, there are some cases in which the strength distribution centers of the far field pattern along the horizontal direction are not matched. A method for controlling an angle of radiation along the horizontal direction of a semiconductor laser, can be achieved, for example, by regulating the composition of an active layer and refractive index distribution along a lateral direction (horizontal direction) of the light guide layer to confine the light in the active layer. For example, regarding the composition, for a 0.78 μm band high output semiconductor laser, materials such AlGaAs are used to form the light guide layer in the active layer and regulate the light density of the active layer with a ratio of AL composition. Regarding an refractive index distribution of the a lateral direction (horizontal direction), the light guide layer is controlled by regulating the width of a ridge formed by etching and the distance between the light absorption implant layer (or low refractive index layer) interface and the active layer interface on both sides of the ridge. Because light emitted from the light emitting point propagates by diverging (spreading out) because of diffraction, the light density at the light emitting point is higher (a near field pattern at the light emitting point become narrower), and an angle of radiation in the far field pattern becomes wider. The use of design manufacturing technique of such a semiconductor laser allows to control the angle of radiation along the horizontal direction.

Next, an effect caused by satisfying a relationship of θh1>θh2 will be described.

Herein, it is assumed that the light source 1a is a light source for DVD recording and the light source 1b is a light source for CD recording.

It is also assumed that the following specific values shown in Table 1 are used as θh1, θh2, θv1, θv2, fo, fc, NA1 and NA2, where θh1 denotes an angle (full-width-half-maximum) of radiation of the light 24a emitted from the light source 1a in the horizontal direction, θh2 denotes an angle (full-width-half-maximum) of radiation of the light 24b emitted from the light source 1b in the horizontal direction, θv1 denotes an angle (full-width-half-maximum) of radiation of the light 24a emitted from the light source 1a in the vertical direction, θv2 denotes an angle (full-width-half-maximum) of radiation of the light 24b emitted from the light source 1b in the vertical direction, fo denotes a focusing distance of the objective lens 6, fc denotes a focusing distance of the collimating lens 5, NA1 denotes a numerical aperture of the objective lens 6 with respect to the light 11 for DVD, and NA2 denotes a numerical aperture of the collimating lens 5 with respect to the light 12 for CD.

It is also assumed that the respective far field patterns for the light 24a and 24b emitted from the light sources 1a and 1b in the horizontal and the vertical directions follow an ideal normal distribution (i.e. Gaussian distribution), and there is no light loss due to refection and/or transmission of the optical parts from the light sources 1a and 1b to the objective lens 6.

TABLE 1

| cond | θh1 (deg) | θh2 (deg) | θh1/θh2 | θv1 (deg) | θv2 (deg) | fo (mm) | fc (mm) | fc/fo | NA1 | NA2 | η1 | η2 | P1 (mW) | P2 (mW) | Po1 (mW) | Po2 (mW) |
|---|---|---|---|---|---|---|---|---|---|---|---|---|---|---|---|---|
| 0 | 9 | 9 | 1.00 | 17 | 17 | 3 | 20 | 6.7 | 0.65 | 0.50 | 0.42 | 0.28 | 200 | 200 | 84 | 56 |
| 1 |   | 8 | 1.13 |   |   |   |   |   |   |   |   | 0.30 |   |   |   | 60 |
| 2 |   | 7 | 1.29 |   |   |   |   |   |   |   |   | 0.33 |   |   |   | 66 |

Condition 0 indicates a case where θh1=θh2=9°. In the optical parameters shown in Table 1, η1 denotes an efficiency of the light entering the objective lens 6 from the light source 1a and η2 denotes an efficiency of the light entering the objective lens 6 from the light source 1b. η1 and η2 are calculated by integrating the Gaussian distribution function. That is, η1=0.42 and η2=0.28. In the case where P1=P2=200 mW, Po1=84 mW and Po2=56 mW, where P1 denotes a maximum rating output of the light source 1a, P2 denotes a maximum rating output of the light source 1b, Po1 denotes a light output from the light source 1a to the objective lens 6 when the light source 1a emits light at its maximum output power, and Po2 denotes a light output from the light source 1b to the objective lens 6 when the light source 1b emits light at its maximum output power.

Condition 1 indicates a case where θh1>θh2 and θh2=8°. In this case, η2 becomes 0.30. It is understood that the efficiency of the light entering the objective lens 6 from the light source 1b is increased compared with condition 0. As a result, Po2 becomes 60 mW. Thus, the output is increased by 4 mW compared with condition 0. In this case, θh1/θh2 is about 1.1.

Condition 2 indicates a case where θh2=7°. In this case, η2 becomes 0.33. It is understood that the efficiency of the light entering the objective lens 6 from the light source 1b is further increased compared with condition 0. As a result, Po2 becomes 66 mW. Thus, the output is increased by 10 mW compared with condition 0. In this case, θh1/θh2 is about 1.3.

It is possible to control θh1/θh2 using design manufacturing techniques for a semiconductor laser as described above. Various characteristics are required for a semiconductor laser when it is used in an apparatus. The various characteristics may include a maximum output rating, operating current, operating voltage, emitting efficiency, angle of radiation of light in the horizontal direction/vertical direction, temperature characteristic, life time, for example. These characteristics are controlled by the structure of the semiconductor laser. In general, when one characteristic is changed by changing the structure of the semiconductor laser, the other characteristics are also changed. Currently, the semiconductor laser having a structure in which a total balance of these characteristics are well determined is practically used as a semiconductor laser for DVD/CD recording. As a result, the angle (full-width-half-maximum) of radiation of the light emitted from the semiconductor laser currently used for DVD recording is substantially equal to the angle (full-width-half-maximum) of radiation of the light emitted from the semiconductor laser currently used for CD recording.

The greater effect of the invention can be obtained, the greater θh1/θh2 is. However, setting θh1 to a value greater than that currently used or setting θh2 to a value smaller than that currently used results in changing the structure of the semiconductor laser currently used. As a result, there may be a risk for degrading a total characteristics of the semiconductor laser by such settings. Such a risk may increase as the value of θh1/θh2 increases.

In the case where θh1/θh2 is about 1.1 in condition 1 described above, although the effect of increasing Po2 is not so significant, the risk for degrading a total characteristics of the semiconductor laser may be relatively low. This means that the possibility of implementing the semiconductor laser may be relatively high.

In the case where θh1/θh2 is about 1.3 in condition 2 described above, although the effect of increasing Po2 is significant, the risk for degrading a total characteristics of the semiconductor laser may be higher than that in condition 1. Therefore, it is desirable to utilize the present invention to set the value of θh1/θh2 to an appropriate value depending on the value of Po2 required for the actual apparatus in view of the risk for degrading a total characteristics of the semiconductor laser.

By utilizing heat when a recording medium is radiated by light when high-speed recording is carried out for recording of CD recording information, it is typical to rotate the record medium at a high speed. However, in this case, because the light power radiated to the recording medium per unit of time decreases, a higher light power from the objective lens is required to be emitted. For that reason, as the example shows above, making the light power from the objective lens higher has an effect of being capable of recording higher-speed information.

In addition, the maximum output rating P1 of a light source for DVD and the maximum the output rating P2 of a light source for CD are P2>P1, θ1h>θ2h as shown above, the high-speed recording performance for CD is expected to improve. When using a semiconductor laser as a light source, there are various ways to improve the maximum output rating. For example, in order for light not to be absorbed into the light emitting end surface, such techniques as including diffusing materials such as Zn near the end surface, making the length of resonator of the semiconductor laser longer and employing a waveguide having an actual refractive index structure with low light absorption loss within the active layer are already well-known in public.

In view of the high speed recording performance to be realized in the apparatus, namely the high speed recording performance of information using the light source 1a and the high speed recording performance of information using the light source 1b, to make each of the high-speed recording performance realized, when comparing the light power Po1 from the light source 1a necessary to be emitted from the objective lens and the light power Po2 from the light source 1b assuming that θ1h>θ2h in the case Po2>Po1, and θ2h>θ1h in the case Po1>Po2, without forcibly increasing the maximum output rating of the light source, there is the effect of making the high speed recording performance of information using both light sources compatible. This is equal to the price-reduction of light source and can make a light emission device comprising a plurality of light sources with different wavelengths cheaper and can also make an information processing apparatus applying the light emission device cheaper.

In the case of a semiconductor laser used for an information recording-reproducing apparatus, as the wavelength becomes shorter, the newer the implementation time is, and selection freedom of attributes such as angle of radiation along the horizontal direction is typically narrow. Accordingly, in apparatuses for recording information in such a plurality of formats of recording medium such as CD-DVD recording dual purpose apparatuses, when an optical system using a light source with a long wavelength is required for a higher light power emitted from the objective lens, light sources with a long wavelength typically have a larger design freedom of angle of radiation along the horizontal direction. Therefore, by setting the angle of radiation along the horizontal direction of light sources with a long wavelength narrower than angle of radiation along the horizontal direction of light sources with a long wavelength can be realized relatively easily. This can also contribute to the price-reduction of light source.

In the two wavelength light source device of the present embodiment, the light emitting point of the light source 1a and the light emitting point of the light source 1b are arranged closer to each other (for example, 150 μm or less). This makes it possible to avoid off-axis aberrations of the light transmitted through the collimating lens and the objective lens, and also makes it possible to avoid the loss in efficiency due to shifting of the centre of aperture limitation of light incident into the objective lens with respect to the center of strength of light incident to the aperture limitation.

The angle (full-width-half-maximum) of radiation of the light emitted from the light source currently used for CD recording in the horizontal direction is approximately 7 degrees, which is considered as a lower limit of the angle of radiation of the light for the light source which is commonly and practically used. However, it is possible to reduce the angle using design manufacturing techniques for a semiconductor laser as described above. This makes it possible to maintain the efficiency of the light source for CD, even if the angle of radiation of the light emitted from the light source for DVD in the horizontal direction is set to a relatively low value in the range from 7 degrees to 10 degrees, for some reasons.

Herein, it is assumed that θh1=8°. In the case where θh1=9° described above, fc is determined as 20 mm. Thus, fc is determined to set the rim strength in the horizontal direction of the light entered from the light source 1a into the objective lens 6 to a value sufficient to obtaining a convergence spot performance for DVD. This can be controlled by setting an optical magnification (fc/fo). In the case where θh1=8°, the condition for obtaining a rim strength in the horizontal direction which is substantially equal to the rim strength in the horizontal direction in the case where θh1:fo=9°:20 mm is θh1:fo=8°:22.5 mm.

Condition 3 indicates a case where θh1>θh2 and θh2=6° under that condition. In this case, η2 becomes 0.30, as shown in Table 2. The output is increased by 10 mW compared with condition 0. In this case, θh1/θh2 is about 1.3.

When the angle of radiation of the light emitted from the light source for DVD in the horizontal direction is set to a relatively high value, it is possible to increase the efficiency of the light source for DVD by changing the optical magnification. For example, in the case where θh1=10°, fc is determined as 18 mm to set the rim strength in the horizontal direction of the light entered from the light source 1a into the objective lens 6 to a value sufficient to obtaining a convergence spot performance for DVD.

Condition 4 indicates a case where θh1>θh2 and θh2=9° under that condition. In this case, η2 becomes 0.33, as shown in Table 2. The output Po2 is increased by 10 mW compared with condition 0. Further, η1 becomes 0.45. The output Po1 is increased by 6 mW compared with condition 0. In this case, θh1/θh2 is about 1.1.

Condition 5 indicates a case where θh2=7°. In this case, η2 becomes 0.38 due to the efficiency increasing effect by the reduction of the optical magnification described above. The output is much increased by 20 mW compared with condition 0. In this case, θh1/θh2 is about 1.4.

formance by improving the efficiency of light from the light sources into the objective lenses, it is needless to show the similar effect in the case that increasing the light power emitted from the objective lens improves the reproducing performance of information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

APPLICABILITY IN INDUSTRY

A light emitting device and information processing apparatus according to the present invention includes a light emitting device with plurality of light sources with different wavelengths arranged in the same housing by making the angle of the radiation in the horizontal direction of one light source smaller than the angle of the radiation in the horizontal direction of the other light source, and is suitable when used to realize the miniaturization capable of reproducing or high speed recording of information and implementation with low price.

TABLE 2

| cond | θh1 (deg) | θh2 (deg) | θh1/θh2 | θv1 (deg) | θv2 (deg) | fo (mm) | fc (mm) | fc/fo | NA1 | NA2 | η1 | η2 | P1 (mW) | P2 (mW) | Po1 (mW) | Po2 (mW) |
|---|---|---|---|---|---|---|---|---|---|---|---|---|---|---|---|---|
| 0 | 9 | 9 | 1.00 | 17 | 17 | 3 | 20 | 6.7 | 0.65 | 0.50 | 0.42 | 0.28 | 200 | 200 | 84 | 56 |
| 3 | 8 | 6 | 1.33 | | | | 22.5 | 7.5 | | | 0.37 | 0.30 | | | 74 | 60 |
| 4 | 10 | 9 | 1.11 | | | | 18 | 6.0 | | | 0.45 | 0.33 | | | 90 | 66 |
| 5 | 10 | 7 | 1.43 | | | | | | | | | 0.38 | | | | 76 |

Setting the angle θv2 of radiation along the vertical direction of light sources for a CD narrower than the angle θv1 of radiation along the vertical direction of light sources for CD can further improve the uptake efficiency of light from the light sources for CD and can have an effect on the improvement in high-speed recording performance of CD.

Figure 4:
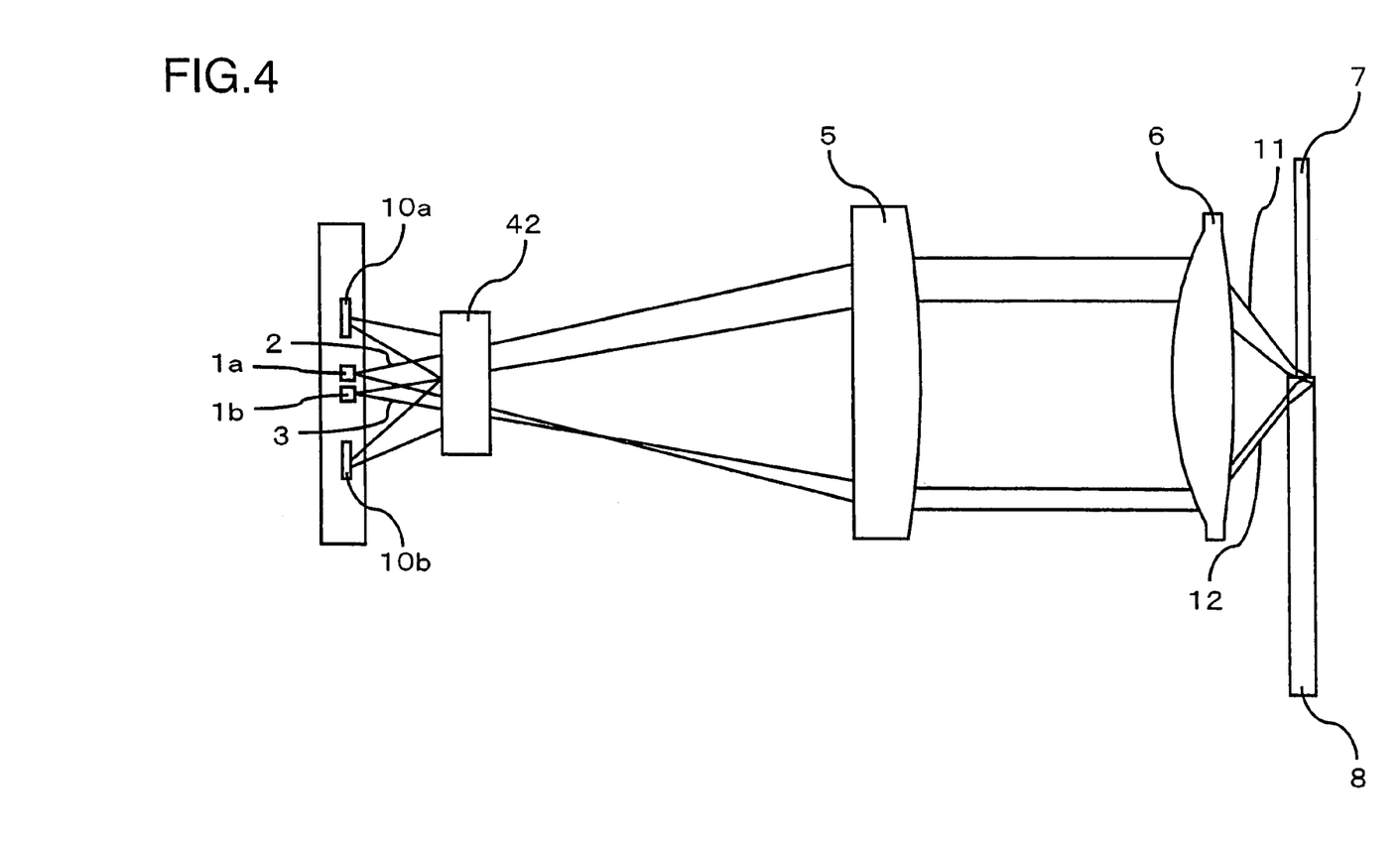
FIG. 4 is a view of the relevant parts of an information processing apparatus according to another embodiment of the present invention.

FIG. 4 is a view of relevant parts indicating another embodiment of the present invention. As shown in FIG. 4, a light source unit 41 comprising the light sources 1a and 1b, and light detectors 10a and 10b within the same housing can expect to improve the miniaturization of the apparatus, price-reduction and reliability. Namely, in the composition of the FIG. 4, light emitted from the light source 1a and reflected from the recording medium 7 enters into the light detectors 10a and 10b through light branch device 42, and the detection of focus, tracking, RF and various signals and the like are made. Light emitted from the light source 1a and reflected from recording medium 8 enters the light detectors 10a and 10b by light branch device 42, and the detection of focus, tracking, RF and various signals and the like are made. The composition of the light detectors 10a and 10b, the light branch device 42 and a detection system of various signals are not essential component of the present invention and the description is thus omitted because various compositions are already well-known.

The embodiments described so far have mainly explained the cases of DVD recording and CD recording as a two wavelength light source device. Including a more highly dense recording medium such a DVD as recently implemented called Blue-ray Disk (hereafter referred to as "BD"), it is needless to say that the present invention can be applied to, for example, a composition of a two wavelength light source device with light sources for BD recording and DVD recording or BD recording and CD recording included within the same housing or a composition of a three wavelength light source device with light sources for BD recording and DVD recording and CD recording included within the same housing. Even though the embodiments described so far have explained improving high-speed recording per-

What is claimed is:

1. A light emitting device comprising:
   a first light source for emitting light having a first wavelength; and
   a second light source for emitting light having a second wavelength which is different from the first wavelength,
   wherein the first light source and the second light source are arranged in the same housing, and
   a relationship of θh1/θh2>1.1 is satisfied, where θh1 denotes an angle (full-width-half-maximum) of radiation of the light emitted from the first light source in the horizontal direction, and θh2 denotes an angle (full-width-half-maximum) of radiation of the light emitted from the second light source in the horizontal direction.

2. A light emitting device according to claim 1, wherein a relationship of θh1/θh2>1.3 is satisfied.

3. A light emitting device according to claim 1, wherein a relationship of P2>P1 is satisfied, where P1 denotes a maximum output rating of the first light source and P2 denotes a maximum output rating of the second light source.

4. A light emitting device according to claim 1, wherein a relationship $\lambda_2>\lambda_1$ is satisfied, where $\lambda_1$ denotes a wavelength of the light emitted from the first light source and $\lambda_2$ denotes a wavelength of the light emitted from the second light source.

5. A light emitting device according to claim 1, wherein a distance between a light emitting point of the first light source and a light emitting point of the second light source is 150 μm or less.

6. A light emitting device according to claim 1, wherein θh2 is 7 degrees or less.

7. A light emitting device according to claim 1, wherein θh1 is 10 degrees or more and θh2 is 8 degrees or less.

8. A light emitting device according to claim 1, wherein a relationship of θv1>θv2 is satisfied, where θv1 denotes an angle (full-width-half-maximum) of radiation of the light emitted from the first light source in the vertical direction, and θv2 denotes an angle (full-width-half-maximum) of radiation of the light emitted from the second light source in the vertical direction.

9. A light emitting device according to claim 1, wherein at least one of the first light source and the second light source is arranged on the same substrate on which a light detector is arranged for receiving light obtained by reflecting the light from one of the first light source and the second light source.

10. An information processing apparatus, comprising:
a light emitting device including a plurality of light sources;
an objective lens for converging light from the plurality of light sources onto a recording medium;
a collimating lens for converting light from the plurality of light sources into substantially collimated light; and
a light detector for receiving reflected light from the recording medium,
wherein the plurality of light sources include a first light source for emitting light having a first wavelength; and a second light source for emitting light having a second wavelength which is different from the first wavelength,
the first light source and the second light source are arranged in the same housing,
a relationship of θh1>θh2 is satisfied, where θh1 denotes an angle (full-width-half-maximum) of radiation of the light emitted from the first light source in the horizontal direction, and θh2 denotes an angle (full-width-half-maximum) of radiation of the light emitted from the second light source in the horizontal direction, and
the objective lens and the collimating lens are configured such that a value of optical magnification fc/fo optimizes a convergence performance in converging the light from the first light source onto the recording medium, where fc denotes a focusing distance of the collimating lens and fo denotes a focusing distance of the objective lens.

11. An information processing apparatus according to claim 10, wherein the value of optical magnification fc/fo is 6.5 or less.

12. An information processing apparatus according to claim 10, wherein a relationship of θh1/θh2>1.1 is satisfied.

13. An information processing apparatus according to claim 10, wherein a relationship of θh1/θh2>1.3 is satisfied.

14. An information processing apparatus according to claim 10, wherein a relationship of P2>P1 is satisfied, where P1 denotes a maximum output rating of the first light source and P2 denotes a maximum output rating of the second light source.

15. An information processing apparatus according to claim 10, wherein a relationship $\lambda_2>\lambda_1$ is satisfied, where $\lambda_1$ denotes a wavelength of the light emitted from the first light source and $\lambda_2$ denotes a wavelength of the light emitted from the second light source.

16. An information processing apparatus according to claim 10, wherein a distance between a light emitting point of the first light source and a light emitting point of the second light source is 150 μm or less.

17. An information processing apparatus according to claim 10, wherein θh2 is 7 degrees or less.

18. An information processing apparatus according to claim 10, wherein θh1 is 10 degrees or more and θh2 is 8 degrees or less.

19. An information processing apparatus according to claim 10, wherein a relationship of θv1>θv2 is satisfied, where θv1 denotes an angle (full-width-half-maximum) of radiation of the light emitted from the first light source in the vertical direction, and θv2 denotes an angle (full-width-half-maximum) of radiation of the light emitted from the second light source in the vertical direction.

20. An information processing apparatus according to claim 10, wherein at least one of the plurality of light sources is arranged on the same substrate on which the light detector is arranged.

* * * * *